US008271037B2

(12) United States Patent
Harmke

(10) Patent No.: US 8,271,037 B2
(45) Date of Patent: Sep. 18, 2012

(54) METHOD AND SYSTEM FOR AUTOMATIC AUDIO ACCESSORY USE POSITION DETECTION AND AUDIO ADJUSTMENT

(75) Inventor: Charles B. Harmke, Port Barrington, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1067 days.

(21) Appl. No.: 11/679,877

(22) Filed: Feb. 28, 2007

(65) Prior Publication Data

US 2008/0207264 A1    Aug. 28, 2008

(51) Int. Cl.
 *H04B 1/38* (2006.01)
 *H04M 1/00* (2006.01)
(52) U.S. Cl. ..................................... 455/557; 455/550.1
(58) Field of Classification Search .................. 340/999; 455/90.1, 575.1, 575.2, 569.1, 66.1, 422.1, 455/414.1, 550.1, 557; 370/338, 329, 466, 370/310
See application file for complete search history.

(56) References Cited

U.S. PATENT DOCUMENTS

| | | | | |
|---|---|---|---|---|
| 6,801,140 | B2 * | 10/2004 | Mantyjarvi et al. | 340/999 |
| 2004/0203510 | A1 * | 10/2004 | Claxton et al. | 455/90.3 |
| 2005/0130593 | A1 * | 6/2005 | Michalak | 455/66.1 |
| 2005/0207470 | A1 | 9/2005 | Bennett et al. | |
| 2007/0004464 | A1 * | 1/2007 | Lair et al. | 455/569.1 |
| 2007/0095195 | A1 * | 5/2007 | Pango et al. | 84/602 |

FOREIGN PATENT DOCUMENTS

| | | |
|---|---|---|
| JP | 05183621 A | 7/1993 |
| KR | 1019980041001 A | 8/1998 |
| KR | 1020000040068 A | 7/2000 |
| KR | 1020040108492 A | 12/2004 |
| KR | 1020060061866 A | 6/2006 |
| WO | 2008106257 A1 | 9/2008 |

OTHER PUBLICATIONS

PCT International Search Report Application No. PCT/US2008/051990 Dated June 26, 2008—10 Pages.
Wired News: A Sixth Sense for a Wire World—6 Pages. http://www.wired.com/News/Technology/0,71087-0.html?TW=WN Technology 10.
International Preliminary Report on Patentability and Written Opinion for International Patent Application No. PCT/US2008/051990 mailed on Sep. 11, 2009.
Office Action mailed on May 28, 2010 in Australian Patent Application No. 2008219544.
Office Action mailed on Sep. 12, 2011 in Canadian Patent Application No. 2676287.

* cited by examiner

*Primary Examiner* — Michael Faragalla
(74) *Attorney, Agent, or Firm* — Barbara R. Doutre

(57) ABSTRACT

A method (500) and system (100) of sensing the position of an audio accessory (102) having at least a microphone (103) can include a sensor (104 and/or 106) for detecting one among a plurality of positions of the audio accessory and a processor (118) programmed to equalize an audio input from the microphone based on which one among the plurality of positions was detected. The sensor can be a thermal sensor, an optical sensor, or a proximity sensor. The audio accessory can be a remote speaker/microphone accessory. Among the plurality of positions that can be detected can include a Mouth Reference Point (MRP) or a Shoulder position. The processor can be further programmed to automatically equalize (508) a microphone input audio based on one of the plurality of positions detected. The system can also be programmed to automatically equalize (512) when a push-to-talk activation occurs at the audio accessory.

16 Claims, 4 Drawing Sheets

| DESCRIPTION | REAR SENSOR | FRONT SENSOR | USE POSITION |
|---|---|---|---|
| WHEN PTT IS PRESSED ... | | | |
| ... FRONT AND BACK OF RSM OPEN | FALSE | FALSE | MRP |
| ... HAND COVERING FRONT, BACK OPEN | FALSE | TRUE | MRP |
| ... FRONT OPEN, HAND COVERING BACK | TRUE | FALSE | MRP |
| ... HAND COVERING FRONT, SHOULDER COVERING BACK | TRUE | TRUE | SHOULDER |

METHOD AND SYSTEM FOR AUTOMATIC AUDIO ACCESSORY USE POSITION DETECTION AND AUDIO ADJUSTMENT

FIELD OF THE INVENTION

This invention relates generally to audio accessories, and more particularly to a method and system of automatically detecting a use position and adjusting audio as a result of such detection.

BACKGROUND

When using a two-way radio or cellular audio accessory in different use positions, the level of the speech signal received by the microphone in the audio accessory can vary considerably. This variance can be very objectionable to the user on the receiving end of the connection.

One known technique for distinguishing the location of a wearable electronic device uses sensors that are embedded into clothing. Depending upon the number of sensors that are closed or open (i.e., fastened), the electronic controller in the clothing can discern certain information about a user. The existing techniques fail to take into account the tactile relationship between the user and the device, which can be used to discern the use position to a better degree and without a separate device such as a clip.

Furthermore, well known Automatic Gain Control (AGC) technology attempts to continuously increase or attenuate a microphone input speech signal to keep the input signal at a target root-mean-square (RMS) value. In this manner, regardless of the use position of the audio accessory, the AGC attempts to keep the signal at a constant RMS level. This technology is far from perfect, and fails under numerous conditions. In addition, even when AGC technology works, it only adjusts the level of the signal and still fails to equalize the frequency response.

SUMMARY

Embodiments in accordance with the present invention can provide systems and methods of sensing the position of an audio accessory having a microphone using a sensor for detecting one among a plurality of positions of the audio accessory to enable an equalization of an audio input from the microphone based on the position detected.

In a first embodiment of the present invention, a system of sensing the position of an audio accessory having at least a microphone can include a sensor in the audio accessory for detecting one among a plurality of positions of the audio accessory and a processor programmed to equalize an audio input from the microphone based on which one among the plurality of positions was detected. The sensor can be a thermal sensor, an optical sensor, or a proximity sensor. The processor can be a digital signal processor and the system can further include at least one analog to digital converter for receiving inputs from the sensor. The audio accessory can be a remote speaker/microphone accessory. Among the plurality of positions that can be detected can include a Mouth Reference Point (MRP) or a Shoulder position. The processor can be further programmed to automatically equalize a microphone input audio based on one of the plurality of positions detected. The processor can further be programmed to automatically equalize a microphone input audio based on a predetermined audio descriptor setting assigned to a given one of the plurality of positions detected. The processor can also be programmed to automatically equalize a microphone input audio based on a predetermined audio descriptor setting assigned among a Mouth Reference Point position detection and a Shoulder position detection. Note, the system can be a wireless radio having push-to-talk capability and serving as a host to the audio accessory where the processor can be further programmed to automatically equalize a microphone input audio based on one of the plurality of positions detected when a push-to-talk activation occurs at the audio accessory.

In a second embodiment of the present invention, an audio accessory coupled to a communication device can include at least a microphone in a housing for the audio accessory, a sensor within the housing for detecting one among a plurality of positions of the audio accessory, and a processor operatively coupled to the sensor where the processor is programmed to equalize an audio input from the microphone based on which one among the plurality of positions was detected. The sensor can be a thermistor, an infrared sensor, or a proximity sensor. The processor can also be a digital signal processor and the plurality of positions can be among at least a Mouth Reference Point (MRP) or a Shoulder position where the digital signal processor is programmed to automatically equalize a microphone input audio based on one of the plurality of positions detected when a push-to-talk activation occurs at the audio accessory.

In a third embodiment of the present invention, a method of audio equalization in an audio accessory can include the steps of sensing one among a plurality of positions (such as a Mouth Reference Point (MRP) or a Shoulder position) for the audio accessory and automatically equalizing an audio input from a microphone in the audio accessory based on which one among the plurality of positions was detected. The step of sensing can include sensing a temperature change or sensing an optical change sensor or sensing a capacitive change. The method can further include the step of converting a signal from a sensor from analog to digital. The method can also automatically equalize a microphone input audio based on a predetermined audio descriptor setting assigned to a given one of the plurality of positions detected. For example, the method can automatically equalize a microphone input audio based on a predetermined audio descriptor setting assigned to a Mouth Reference Point position detection or a Shoulder position detection. The method can also automatically equalize a microphone input audio based on one of the plurality of positions detected when a push-to-talk activation occurs at the audio accessory.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system. The "processor" as described herein can be any suitable component or combination of components, including any suitable hardware or software, that are capable of executing the processes described in relation to the inventive arrangements.

Other embodiments, when configured in accordance with the inventive arrangements disclosed herein, can include a system for performing and a machine readable storage for causing a machine to perform the various processes and methods disclosed herein.

DETAILED DESCRIPTION OF THE DRAWINGS

Figure 1:
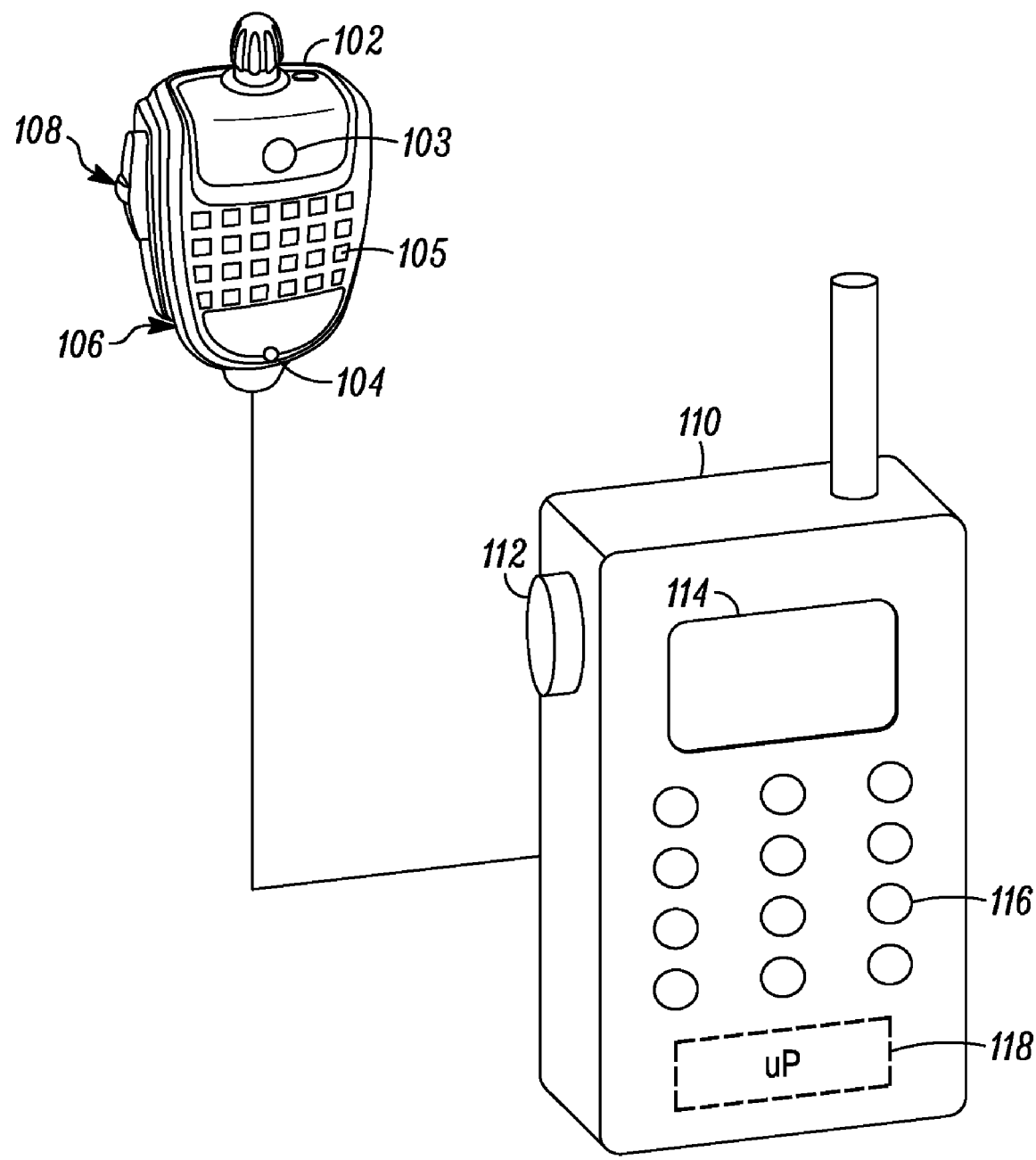
FIG. 1 is an illustration of a system including an audio accessory in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Embodiments herein can be implemented in a wide variety of exemplary ways to provide a system or method of audio equalizing an audio accessory based at least in part on a detected (or inferred) position of the audio accessory.

In several embodiments, sensors can be embedded in or on a user's person or clothing and/or on the printed circuit board of the audio accessory. The sensors can be placed in such a way as to detect the position that the accessory is being used in. An example or application of the embodiments is a two-way radio Remote Speaker/Microphone (RSM) or audio accessory 102 as part of a system 100 as illustrated in FIG. 1. The RSM accessory or audio accessory 102 can include a front sensor 104 and a rear sensor 106 as well as a speaker 105 and a microphone 103. Optionally, the audio accessory can include a push-to-talk (PTT) button 108 used to activate a PTT communication. The system 100 can further include a two-way radio, cellular phone or other wireless communication device 110 serving as the host device for the audio accessory 102. The device 110 can include a user interface that can include a display 114 and keypad 116. The device 110 can further include a PTT button 112 that operates similarly to the PTT button 108 of the audio accessory 102. The device can further include a processor or controller 118 such as a digital signal processor (DSP) that can control the operations and functions of the device 118 as well as the audio accessory 102 in accordance with the embodiments herein. Alternatively or optionally, the audio accessory 102 can include its own processor to provide similar functionality in accordance with the embodiments.

Figure 2:
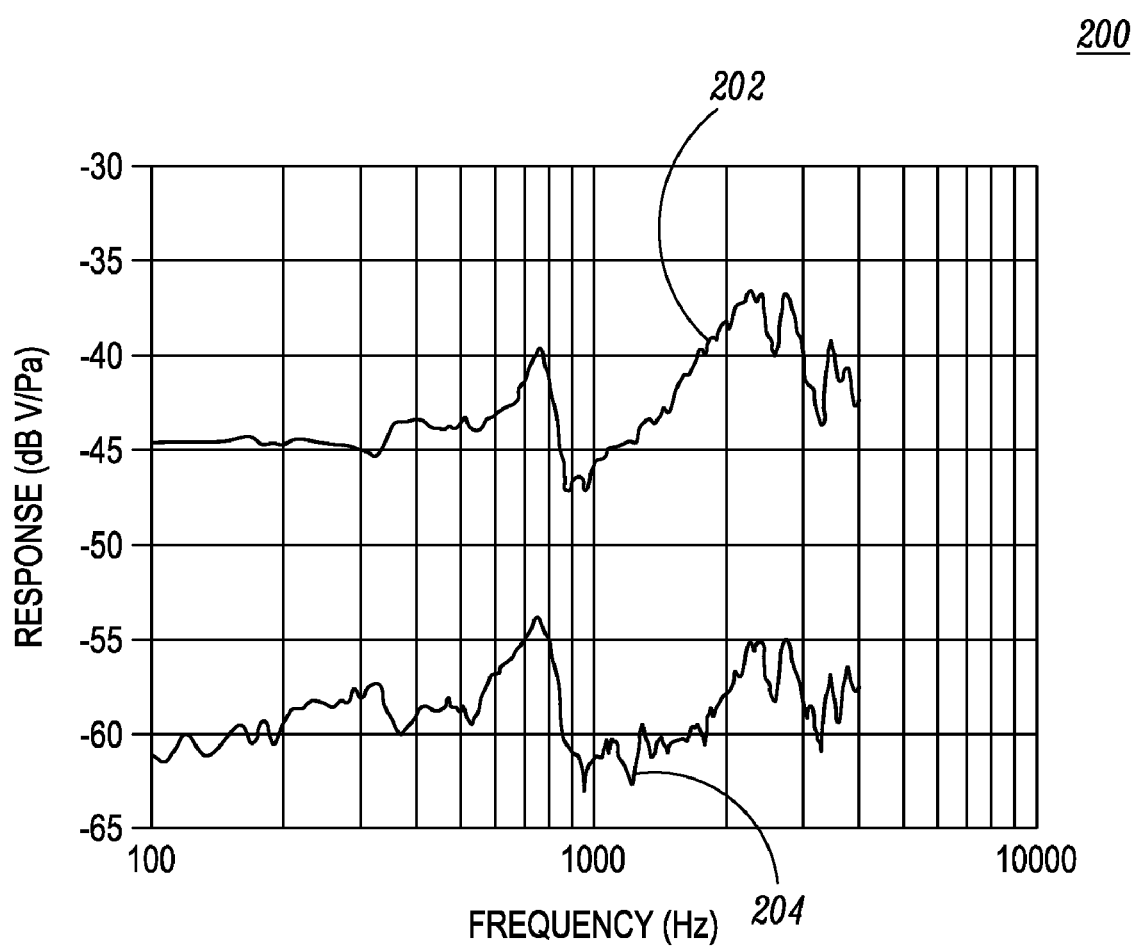
FIG. 2 is a frequency response chart illustrating the frequency response difference between voice input at a Mouth Reference Point and at a shoulder position in accordance with an embodiment of the present invention.
Figures 3, 4:
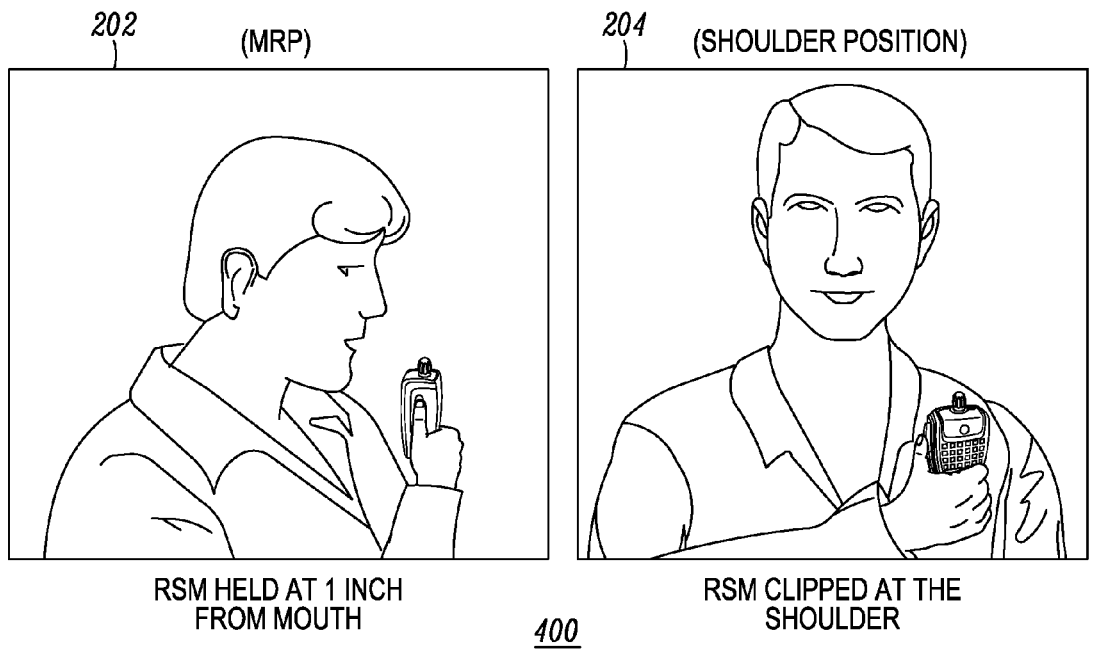
FIG. 3 is truth table illustrating the logic used in an audio accessory having a sensor in accordance with an embodiment of the present invention.
FIG. 4 is an illustration of the audio accessory as used at either the Mouth Reference Point or the Shoulder position in accordance with an embodiment of the present invention.

FIG. 2 is a frequency response chart 200 illustrating the frequency response difference between voice input at a Mouth Reference Point 202 and at a shoulder position 204 in accordance with an embodiment of the present invention. FIG. 4 illustrates a user utilizing the RSM in the two predominant RSM use positions 400 with the Mouth Reference Point (MRP) 202, which is approximately one inch (1") in front of the mouth, and the Shoulder position 204

As seen in FIG. 2. the frequency response 202 of the RSM at the MRP is significantly better than the frequency response 204 of the RSM at the Shoulder position. By detecting the position of the user's hand on the RSM (102) when the PTT (Push-to-Talk) button (108) is pressed, the use position can be deduced as either MRP or Shoulder position. The logic of how the audio accessory operates can be accomplished using the sensors on the front and rear of the audio accessory (as illustrated in FIG. 1) is shown in a truth table of FIG. 3. For example, when the PTT button (108) is depressed on an audio accessory or RSM, there are certain use cases that are indicative of use at the MRP and very few use cases indicative of a Shoulder position. More specifically, when the sensors fail to detect that the front and back sides are open, or when the sensors detect that either one among the front or the back sides are open, then the MRP is indicated. In one embodiment, only when the front sensor indicates that the hand is covering the front and the rear sensors indicates that the shoulder is covering the rear does the truth table result in indicating a Shoulder position.

The sensors can be thermal (e.g., thermistor), optical (e.g., infrared), proximity, or other types of sensors. In some instances, a sensor that provides position (such as a measure of tilt) can be used alternatively or in addition to other sensors to enable the system to deduce the appropriate positioning. The outputs of the sensors can be routed to an analog-to-digital (A/D) converter to provide digital inputs on a DSP (Digital Signal Processor). The software controlling the processor can sample the A/D inputs and implement the logic shown in FIG. 3 or other appropriate logic that would provide sufficiently accurate indications of the positioning of the RSM or audio accessory. If the MRP is the use position indicated, then the DSP can implement the audio parameters meant to equalize audio from the microphone when used in the MRP. If the Shoulder position is the use position indicated, then the DSP can then implement the audio parameters meant to equalize audio from the microphone when used at the Shoulder position.

Figure 5:
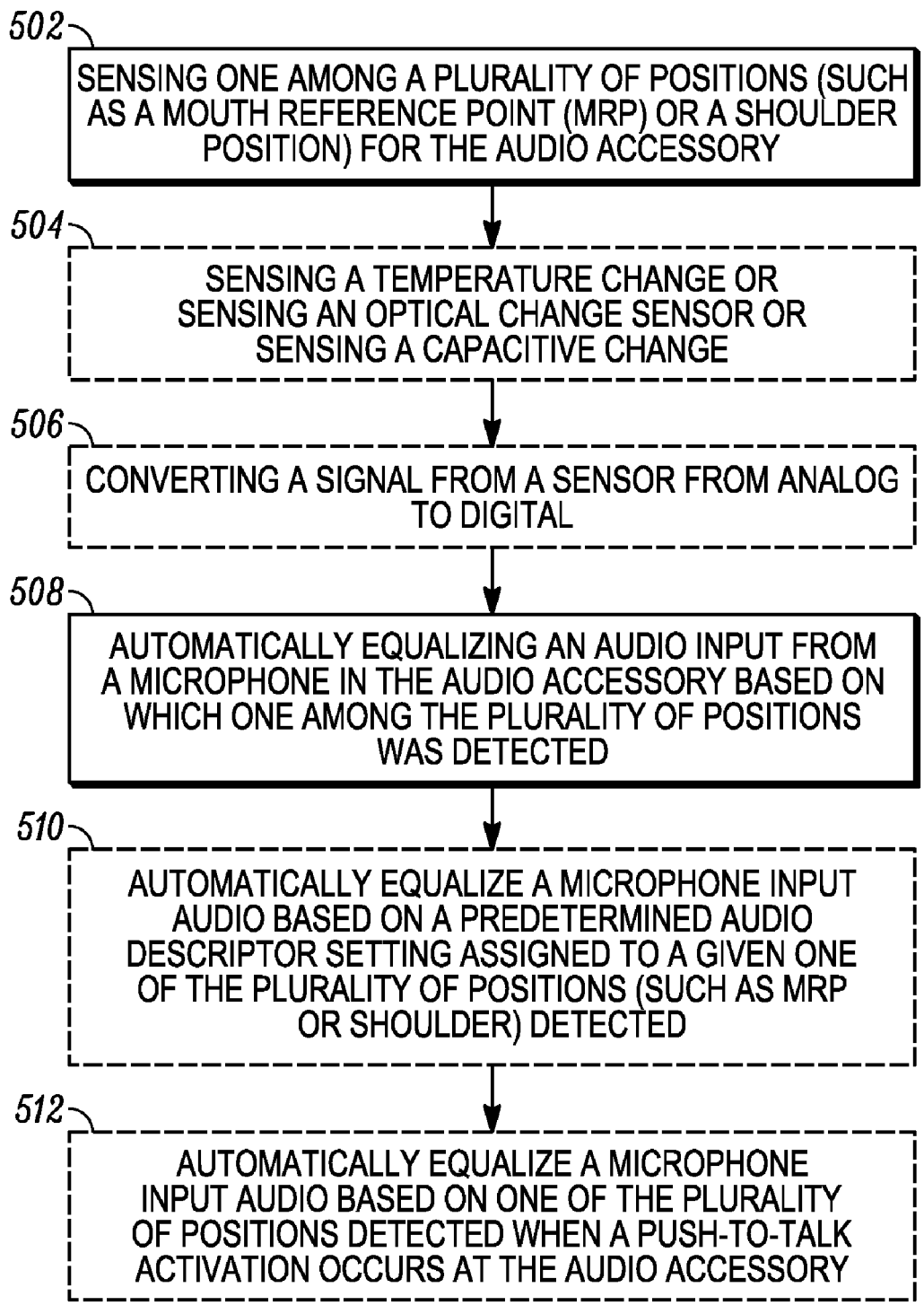
FIG. 5 is a flow chart of a method of audio equalization in an audio accessory in accordance with an embodiment of the present invention.

Referring to FIG. 5, a flow chart illustrating a method 500 of audio equalization in an audio accessory can include the step 502 of sensing one among a plurality of positions (such as a Mouth Reference Point (MRP) or a Shoulder position) for the audio accessory and automatically equalizing at step 508 an audio input from a microphone in the audio accessory based on which one among the plurality of positions was detected. The step 502 of sensing can include sensing a temperature change or sensing an optical change or sensing a capacitive change at step 504. The method 500 can further include converting a signal from a sensor from analog to digital at step 506. The method at step 510 can (optionally or alternatively) automatically equalize a microphone input audio based on a predetermined audio descriptor setting assigned to a given one of the plurality of positions detected. For example, the method can automatically equalize a microphone input audio based on a predetermined audio descriptor setting assigned to a Mouth Reference Point position detection or a Shoulder position detection. The method 500 can (optionally or alternatively) automatically equalize a microphone input audio based on one of the plurality of positions detected when a push-to-talk activation occurs at the audio accessory at step 512.

The embodiments herein provide an automatic technique for determining the use position of an audio accessory. Simply by monitoring the position of the users hand and body in relation to the sensors in the accessory, the use position can automatically be deduced without any further interaction by the user. By knowing the use position, the microphone audio can be equalized appropriately using the audio descriptors designed specifically for that use position. The end result is system audio that is at a consistent level with improved intelligibility and better quality.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A system of sensing the position of an audio accessory, comprising:
    a sensor in the audio accessory for detecting one among a plurality of positions of the audio accessory relative to a body of a user of the audio accessory, wherein the audio accessory includes at least a microphone and further wherein each of the plurality of positions of the audio accessory is assigned a predetermined audio descriptor setting,
    wherein the system further comprises a wireless radio having push-to-talk capability and serving as a host to the audio accessory; and
    a processor programmed to equalize an audio input from the microphone based on the predetermined audio descriptor setting assigned corresponding to which one among the plurality of positions of the audio accessory relative to the body of the user was detected,
    wherein the processor is further programmed to automatically equalize a microphone input audio based on one of the plurality of positions detected when a push-to-talk activation occurs at the audio accessory.

2. The system of claim 1, wherein the sensor is a thermal sensor, an optical sensor, or a proximity sensor.

3. The system of claim 1, wherein the processor comprises a digital signal processor and the system further comprises at least one analog to digital converter for receiving inputs from the sensor.

4. The system of claim 1, wherein the plurality of positions comprises a Mouth Reference Point (MRP) or a Shoulder position.

5. The system of claim 1, wherein the audio accessory comprises a remote speaker/microphone accessory.

6. The system of claim 1, wherein the processor is further programmed to automatically equalize a microphone input audio based on one of the plurality of positions detected.

7. The system of claim 6, wherein the processor is further programmed to automatically equalize a microphone input audio based on the predetermined audio descriptor setting assigned to a given one of the plurality of positions detected.

8. A system of sensing the position of an audio accessory, comprising:
    a sensor in the audio accessory for detecting one among a plurality of positions of the audio accessory relative to a body of a user of the audio accessory, wherein the audio accessory includes at least a microphone and further wherein each of the plurality of positions of the audio accessory is assigned a predetermined audio descriptor setting; and
    a processor programmed to equalize an audio input from the microphone based on the predetermined audio descriptor setting assigned corresponding to which one among the plurality of positions of the audio accessory relative to the body of the user was detected,
    wherein the processor is further programmed to automatically equalize a microphone input audio based on the predetermined audio descriptor setting assigned among a Mouth Reference Point position detection and a Shoulder position detection.

9. An audio accessory coupled to a communication device, comprising:
    a microphone in a housing for the audio accessory;
    a sensor within the housing for detecting one among a plurality of positions of the audio accessory relative to a body of a user of the audio accessory, wherein each of the plurality of positions of the audio accessory is assigned a predetermined audio descriptor setting; and
    a processor operatively coupled to the sensor, wherein the processor is programmed to equalize an audio input from the microphone based on the predetermined audio descriptor setting assigned corresponding to which one among the plurality of positions of the audio accessory relative to the body of the user was detected, wherein the processor comprises a digital signal processor and the plurality of positions comprises at least a Mouth Reference Point (MRP) or a Shoulder position wherein the digital signal processor is programmed to automatically equalize a microphone input audio based on one of the plurality of positions detected when a push-to-talk activation occurs at the audio accessory.

10. The audio accessory of claim 9, wherein the sensor is a thermistor, an infrared sensor, or a proximity sensor.

11. A method of audio equalization in an audio accessory, comprising the steps of:
    assigning a predetermined audio descriptor setting to each of a plurality of positions of the audio accessory relative to a body of a user of the audio accessory;
    sensing one among the plurality of positions for the audio accessory relative to the body of the user of the audio accessory, wherein the step of sensing the plurality of positions comprises the step one among a Mouth Reference Point (MRP) and a Shoulder position; and
    automatically equalizing an audio input from a microphone in the audio accessory based on the predetermined audio descriptor setting assigned corresponding to which one among the plurality of positions of the audio accessory relative to the body of the user was detected.

12. The method of claim 11, wherein the step of sensing comprising the step of sensing a temperature change or sensing an optical change sensor or sensing a capacitive change.

13. The method of claim 11, wherein the method further comprises the step of converting a signal from a sensor from analog to digital.

14. The method of claim 11, wherein the method further automatically equalizes a microphone input audio based on the predetermined audio descriptor setting assigned to a given one of the plurality of positions detected.

15. The method of claim 11, wherein the method further automatically equalizes a microphone input audio based on a predetermined audio descriptor setting assigned among a Mouth Reference Point position detection and a Shoulder position detection.

16. The method of claim 11, wherein the method further automatically equalizes a microphone input audio based on one of the plurality of positions detected when a push-to-talk activation occurs at the audio accessory.

* * * * *